US012308538B2

(12) United States Patent
Kamamoto et al.

(10) Patent No.: US 12,308,538 B2
(45) Date of Patent: May 20, 2025

(54) PCB TERMINAL, CONNECTOR, WIRING HARNESS WITH CONNECTOR AND BOARD UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Michitake Kamamoto, Mie (JP); Kingo Furukawa, Mie (JP); Yoshifumi Saka, Mie (JP); Hajime Watanabe, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 449 days.

(21) Appl. No.: 17/911,887

(22) PCT Filed: Mar. 24, 2021

(86) PCT No.: PCT/JP2021/012430
§ 371 (c)(1),
(2) Date: Sep. 15, 2022

(87) PCT Pub. No.: WO2021/193781
PCT Pub. Date: Sep. 30, 2021

(65) Prior Publication Data
US 2023/0130798 A1 Apr. 27, 2023

(30) Foreign Application Priority Data
Mar. 26, 2020 (JP) ................................ 2020-056657

(51) Int. Cl.
*H01R 12/58* (2011.01)
*C25D 3/12* (2006.01)
(Continued)

(52) U.S. Cl.
CPC ............... *H01R 12/58* (2013.01); *C25D 3/12* (2013.01); *C25D 3/30* (2013.01); *C25D 3/58* (2013.01);
(Continued)

(58) Field of Classification Search
None
See application file for complete search history.

(56) References Cited

U.S. PATENT DOCUMENTS 5,259,111 A 11/1993 Watanabe
8,835,771 B2 * 9/2014 Masago ................ H01R 12/55 174/250
(Continued)

FOREIGN PATENT DOCUMENTS

JP H01-225781 A 9/1989
WO 2018/221087 A1 12/2018

OTHER PUBLICATIONS

International Search Report issued on Jul. 13, 2021 for WO 2021/193781 A1 (4 pages).

*Primary Examiner* — Tho D Ta
(74) *Attorney, Agent, or Firm* — Venjuris, P.C.

(57) ABSTRACT

A PCB terminal is provided with a rod-like base material and a plating layer covering a predetermined region of the base material. A constituent material of the base material is a copper alloy containing 20% by mass or more of zinc. The plating layer includes a first coating portion and a second coating portion. The first coating portion includes an entire peripheral layer entirely covering a region on side of a first end part, out of both end parts of the base material, in a
(Continued)

circumferential direction of the base material. The second coating portion partially covers a region on side of a second end part, out of the both end parts of the base material, in the circumferential direction of the base material. The entire peripheral layer includes a tin-based layer and a barrier layer.

11 Claims, 4 Drawing Sheets

(51) Int. Cl.

| | |
|---|---|
| ***C25D 3/30*** | (2006.01) |
| ***C25D 3/58*** | (2006.01) |
| ***C25D 3/60*** | (2006.01) |
| ***C25D 5/12*** | (2006.01) |
| ***C25D 7/00*** | (2006.01) |
| ***H01R 13/03*** | (2006.01) |
| ***H01R 43/16*** | (2006.01) |

(52) U.S. Cl.
CPC ................. *C25D 3/60* (2013.01); *C25D 5/12* (2013.01); *C25D 7/00* (2013.01); *H01R 13/03* (2013.01); *H01R 43/16* (2013.01)

(56) References Cited

U.S. PATENT DOCUMENTS

| | | | | |
|---|---|---|---|---|
| 10,177,478 | B2 * | 1/2019 | Watanabe ................ | C25D 7/00 |
| 2001/0008709 | A1 * | 7/2001 | Asakura ................. | H01R 13/03 428/929 |
| 2007/0218312 | A1 | 9/2007 | Sakuyama et al. | |
| 2008/0188100 | A1 * | 8/2008 | Saitoh .................... | H01R 13/03 439/82 |
| 2016/0240950 | A1 | 8/2016 | Watanabe et al. | |
| 2017/0033486 | A1 * | 2/2017 | Saka ...................... | H01R 13/03 |
| 2017/0302016 | A1 * | 10/2017 | Watanabe ................ | C25D 5/12 |

* cited by examiner

PCB TERMINAL, CONNECTOR, WIRING HARNESS WITH CONNECTOR AND BOARD UNIT

CROSS REFERENCE TO RELATED APPLICATIONS

This application is a national phase of PCT application No. PCT/JP2021/012430, filed on 24 Mar. 2021, which claims priority from Japanese patent application No. 2020-056657, filed on 26 Mar. 2020, all of which are incorporated herein by reference.

TECHNICAL FIELD

The present disclosure relates to a PCB terminal, a connector, a wiring harness with connector and a board unit.

BACKGROUND

A rod-like terminal is used as a terminal for connecting a mating terminal and a printed circuit board (PCB), i.e. as a PCB terminal. The PCB terminal typically includes a base material made of copper alloy and a tin plating layer covering the surface of the base material as described in [0002] of the description of Patent Document 1.

PRIOR ART DOCUMENT

Patent Document

Patent Document 1: JP 2015-094000 A

SUMMARY OF THE INVENTION

Problems to be Solved

A PCB terminal of the present disclosure is provided with a rod-like base material, and a plating layer covering a predetermined region of the base material, wherein a constituent material of the base material is a copper alloy containing 20% by mass or more of zinc, the plating layer includes a first coating portion and a second coating portion, the first coating portion includes an entire peripheral layer entirely covering a region on side of a first end part, out of both end parts of the base material, in a circumferential direction of the base material, the second coating portion partially covers a region on side of a second end part, out of the both end parts of the base material, in the circumferential direction of the base material, the entire peripheral layer includes a tin-based layer and a barrier layer, the tin-based layer includes a pure tin layer constituting an outermost surface of the first coating portion, and a constituent material of the barrier layer is pure nickel or a copper-tin alloy containing copper and tin.

A connector of the present disclosure is provided with the PCB terminal of the present disclosure.

A wiring harness with connector of the present disclosure is provided with the connector of the present disclosure and a wiring harness, and the wiring harness is connected to the region on the side of the second end part in the PCB terminal.

A board unit of the present disclosure is provided with the connector of the present disclosure or the wiring harness with connector of the present disclosure, and a printed wiring board, and the region on the side of the first end part in the PCB terminal and the printed wiring board are connected by solder.

DETAILED DESCRIPTION TO EXECUTE THE INVENTION

Technical Problem

Figure 1:
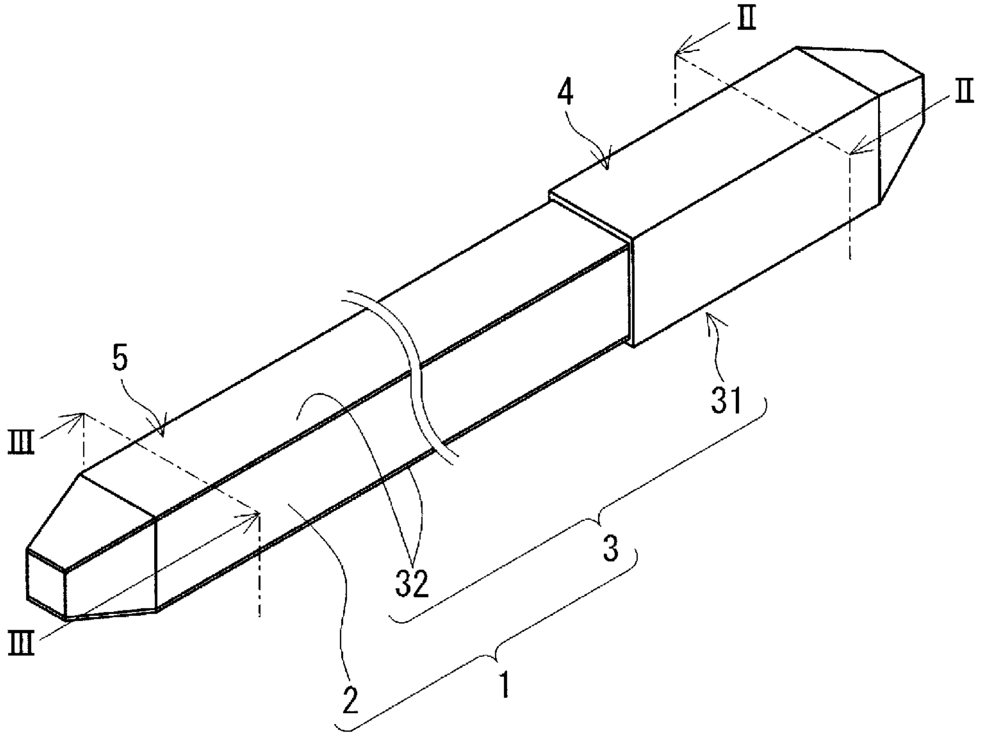
FIG. 1 is a perspective view schematically showing a PCB terminal according to an embodiment.

A PCB terminal is desired to be excellent in solder wettability and insertability into a mating terminal. Conventionally, a so-called post-plating method has been used as described in Patent Document 1 to ensure good solder wettability. The post-plating method is a method for forming a plating layer on a base material after the base material of a predetermined shape is formed by stamping a plate material or applying plastic working. In the post-plating method, the outer peripheral surface of the base material is covered substantially over an entire periphery by the plating layer. Thus, the tin plating layer covering the entire periphery of the base material can contact solder. Therefore, the PCB terminal by the post-plating method is excellent in solder wettability.

However, in the post-plating method, an enlarged part may be formed by a locally thickened part of the plating layer covering an end part of the base material. Due to the enlarged part, it is difficult for a worker to insert the PCB terminal into the mating terminal. Particularly, some of connectors used in control units and the like are multipole connectors including many PCB terminals. In a multipole connector, an insertion force at the time of connecting connectors increases in proportion to the number of the PCB terminals. Thus, a burden of a worker increases. Therefore, excellent workability in inserting the respective PCB terminal into the mating terminals, i.e. excellent insertability into the mating terminals, is desired.

The present inventors acquired such knowledge that a PCB terminal excellent in both solder wettability and insertability into a mating terminal was obtained by forming a secondary plating layer only on a first end part, out of both end parts of a rod-like material obtained using a so-called pre-plating method, by the post-plating method. Note that the pre-plating method is a method for, after a plating layer is formed on a plate material as a material of a base material, forming the obtained plated plate into a predetermined shape, such as by stamping the plated plate. A method compositely using the pre-plating method and partial secondary plating by the post-plating method may be called a multistage plating method below.

As a result of study, the present inventors found that there was a room for improvement in suppressing soldering failures and suppressing whiskers as described below in the case of using the aforementioned multistage plating method.

When soldering is applied to the PCB terminal, icicle-like pointed protrusions may be formed, such as because solder in a molten state is solidified in a hanging state. These protrusions are called solder icicles. The solder icicles are one of soldering failures. In a multipole connector, many PCB terminals are proximately arranged. Thus, the PCB terminal with long solder icicles and the adjacent PCB terminal are thought to become conductive, i.e. short-circuited by the solder icicles. To prevent the above short circuit, it is desired that the solder icicles are short and, preferably, substantially no solder icicles are formed.

In the PCB terminal having the tin plating layer as an outermost layer, needle-like protrusions made of tin may be formed on the surface of the tin plating layer, for example, due to a stress from the base material or the like. These needle-like protrusions are called whiskers. In the above multipole connector, the PCB terminal with whiskers and the adjacent PCB terminal are thought to become conductive, i.e. be short-circuited by the whiskers. To prevent the above short circuit, it is desired that substantially no whiskers are formed.

Particularly, if a constituent material of the base material is a copper alloy containing 20% by mass or more of Zn, long solder icicles and whiskers are easily formed.

Accordingly, one object of the present disclosure is to provide a PCB terminal capable of suppressing soldering failures and whiskers. Another object of the present disclosure is to provide a connector, a wiring harness with connector and a board unit capable of suppressing soldering failures and whiskers.

Effect of Invention

The PCB terminal of the present disclosure, the connector of the present disclosure, the wiring harness with connector of the present disclosure and the board unit of the present disclosure can suppress soldering failures and whiskers.

Description of Embodiments of Present Disclosure

The present inventors acquired such knowledge that both solder icicles and whiskers could be suppressed by including a specific plating layer if a constituent material of a base material is a copper alloy containing 20% by mass or more of Zn. The present disclosure is based on the above knowledge.

First, embodiments of the present disclosure are listed and described.

(1) A PCB terminal according to one aspect of the present disclosure is provided with a rod-like base material, and a plating layer covering a predetermined region of the base material, wherein a constituent material of the base material is a copper alloy containing 20% by mass or more of zinc, the plating layer includes a first coating portion and a second coating portion, the first coating portion includes an entire peripheral layer entirely covering a region on side of a first end part, out of both end parts of the base material, in a circumferential direction of the base material, the second coating portion partially covers a region on side of a second end part, out of the both end parts of the base material, in the circumferential direction of the base material, the entire peripheral layer includes a tin-based layer and a barrier layer, the tin-based layer includes a pure tin layer constituting an outermost surface of the first coating portion, and a constituent material of the barrier layer is pure nickel or a copper-tin alloy containing copper and tin.

The PCB terminal of the present disclosure can suppress whiskers in addition to suppressing solder icicles, which is one of soldering failures, by the entire peripheral layer including the barrier layer.

Further, the PCB terminal of the present disclosure is excellent in solder wettability by the entire peripheral layer including the pure tin layer and the outermost surface being constituted by the pure tin layer on the side of the first end part.

Further, the region on the side of the second end part of the PCB terminal of the present disclosure is easily inserted into a mating terminal as described below. In the PCB terminal of the present disclosure, the base material is partially covered with the plating layer on the side of the second end part. A remaining part of the base material is exposed without being covered with the plating layer. Such a PCB terminal of the present disclosure can be typically manufactured by the aforementioned multistage plating method. In the PCB terminal manufactured by the multistage plating method, the plating layer on the side of the second end part is formed by a pre-plating method. In the plating layer by the pre-plating method, the aforementioned enlarged part is hardly formed as compared to a post-plating method. Further, the plating layer by the pre-plating method tends to have a uniform thickness as compared to the post-plating method. Such a PCB terminal of the present disclosure is excellent in insertability into the mating terminal on the side of the second end part.

(2) As an example of the PCB terminal of the present disclosure, a constituent material of the barrier layer is pure nickel, the tin-based layer includes an alloy portion in contact with the barrier layer, and a constituent material of the alloy portion is an alloy containing tin and nickel.

The PCB terminal of the above form is typically manufactured by applying a heat treatment after post-plating in the aforementioned multistage plating method. In this case, voids are not present between the barrier layer and the pure tin layer. Thus, in this form, connection resistance is not increased due to voids.

(3) As an example of the PCB terminal of the present disclosure, a thickness of the barrier layer is 0.4 μm or more.

The PCB terminal of the above form can more reliably suppress solder icicles and whiskers by the barrier layer.

(4) As an example of the PCB terminal of the present disclosure, the first coating portion includes a thin film portion and a thick film portion at positions different in the circumferential direction of the base material, the thin film portion is constituted by a part of the entire peripheral layer, the thick film portion includes a remaining part of the entire peripheral layer and a partial coating layer provided closer to the base material than the entire peripheral layer, the partial coating layer extends in the region on the side of the second end part of the base material, and the second coating portion is constituted by an extending part of the partial coating layer.

The PCB terminal of the above form can be manufactured by the aforementioned multistage plating method. In this respect, the PCB terminal of the above form is excellent in insertability into the mating terminal.

(5) As an example of the PCB terminal of (4) described above, the partial coating layer includes an intermediate layer and an outer layer, a constituent material of the intermediate layer is a copper-tin alloy containing tin and copper, a constituent material of the outer layer is pure tin, and the copper-tin alloy constituting the intermediate layer is partially exposed from the outer layer.

The PCB terminal of the above form more easily suppresses whiskers by including the intermediate layer. Further, the PCB terminal of the above form is more excellent in insertability into the mating terminal by the second coating portion being constituted by the partial coating layer having the above specific structure.

(6) A connector according to one aspect of the present disclosure is provided with the PCB terminal of any one of (1) to (5) described above.

The connector of the present disclosure can suppress solder icicles and whiskers on the side of the first end part of the PCB terminal. Further, the connector of the present disclosure is excellent in the solder wettability of the first end part of the PCB terminal and a printed wiring board. Further, in the connector of the present disclosure, the second end part of the PCB terminal is easily inserted into a mating terminal provided in a mating connector.

(7) A wiring harness with connector according to one aspect of the present disclosure is provided with the connector of (6) described above and a wiring harness, and the wiring harness is connected to the region on the side of the second end part in the PCB terminal.

The wiring harness with connector of the present disclosure can suppress solder icicles and whiskers on the side of the first end part of the PCB terminal. Further, the wiring harness with connector of the present disclosure is excellent in the solder wettability of the first end part of the PCB terminal and a printed wiring board. Further, in the wiring harness with connector of the present disclosure, the second end part of the PCB terminal is easily inserted into a mating terminal provided in a mating connector.

(8) A board unit according to one aspect of the present disclosure is provided with the connector of (6) described above or the wiring harness with connector of (7) described above, and a printed wiring board, and the region on the side of the first end part in the PCB terminal and the printed wiring board are connected by solder.

The board unit of the present disclosure can suppress solder icicles and whiskers on the side of the first end part of the PCB terminal. Thus, the first end parts of adjacent ones of the PCB terminals are prevented from being short-circuited by solder icicles and shorted-circuited by whiskers. Further, in the board unit of the present disclosure, the first end part of the PCB terminal and the printed wiring board are satisfactorily connected by the solder. Thus, connection resistance between the PCB terminal and the printed wiring board is low. Further, in the board unit of the present disclosure, the second end part of the PCB terminal is easily inserted into a mating terminal provided in a mating connector. Thus, a worker can easily connect the connectors. Therefore, a burden of the worker is reduced.

(9) As an example of the board unit of the present disclosure, the printed wiring board includes a control circuit for controlling at least one of engine fuel injection and engine ignition.

In the above application, the connector may be a multipole connector including, for example, 200 or more, further 250 or more PCB terminals. Even in this case, the first end parts of adjacent ones of the PCB terminals are suppressed from being short-circuited by solder icicles and whiskers.

Details of Embodiment of Present Disclosure

An embodiment of the present disclosure is described below with reference to the drawings. The same reference signs denote the same components in figures.

PCB Terminal (Summary)

A PCB (Printed Circuit Board) terminal of the embodiment is described below mainly with reference to FIGS. 1 to 3.

Figure 4:
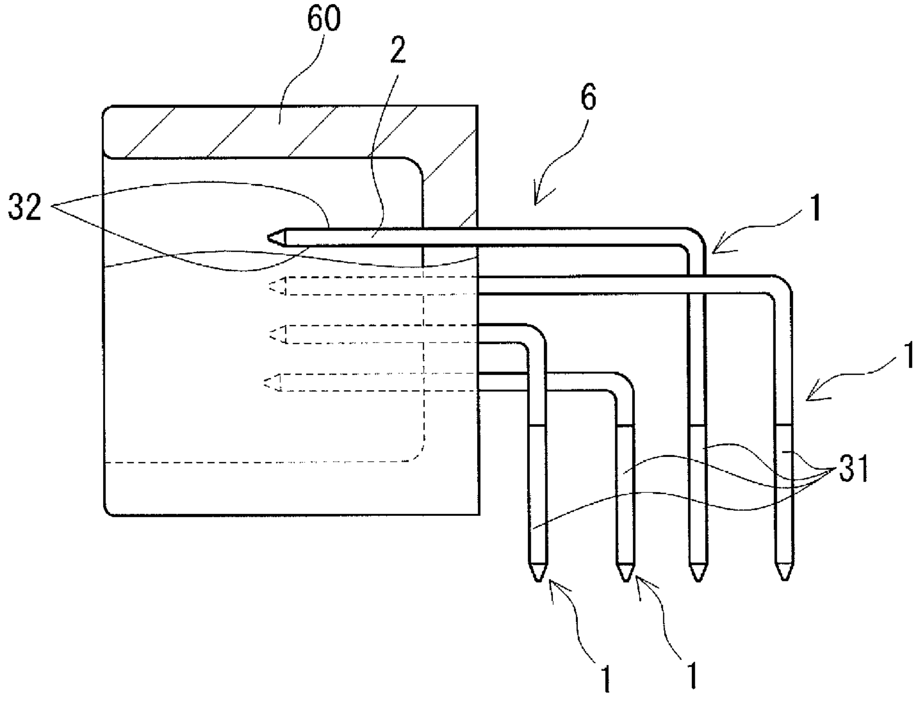
FIG. 4 is a side view schematically showing a connector according to the embodiment.
Figure 6:
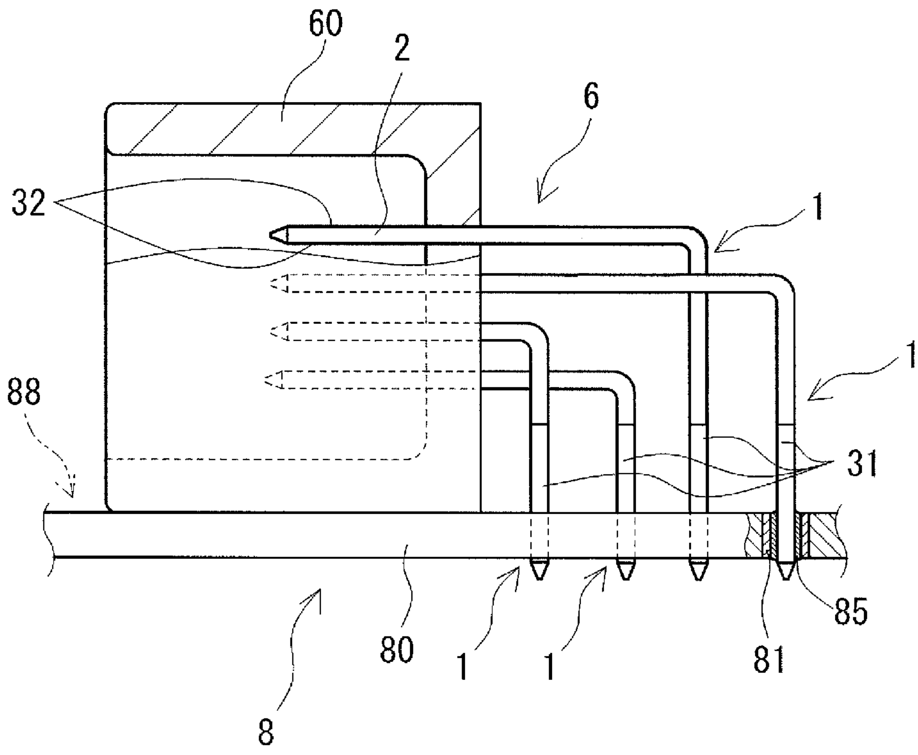
FIG. 6 is a side view schematically showing a board unit according to the embodiment.

The PCB terminal 1 of the embodiment is a rod-like metal member as shown in FIG. 1. The PCB terminal 1 is typically used as an electrical connecting member by being supported in a housing 60 of a connector 6 as shown in FIG. 4 to be described later. Out of two end parts of the PCB terminal 1, a region on the side of a first end part is used as a connection region to a printed wiring board 80 as shown in FIG. 6 to be described later. Out of the both end parts of the PCB terminal 1, a region on the side of a second end part is used as a connection region to a mating terminal.

The PCB terminal 1 of the embodiment includes a rod-like base material 2 and a plating layer 3. The plating layer 3 covers a predetermined region of the base material 2. A constituent material of the base material 2 is a copper alloy containing 20% by mass or more of zinc.

In the PCB terminal 1 of the embodiment, a range of the surface of the base material 2 covered by the plating layer 3 is different in each end part of the PCB terminal 1. On the side of the first end part of the base material 2, the plating layer 3 has an entire peripheral layer 4. The entire peripheral layer 4 covers the base material 2 entirely in a circumferential direction as shown in FIG. 2. On the side of the second end part of the base material 2, the plating layer 3 is provided to partially cover the base material 2 in the circumferential direction as shown in FIG. 3. That is, remaining parts of the base material 2 in the circumferential direction are exposed without being covered by the plating layer 3 on the side of the second end part of the base material 2.

Particularly, in the PCB terminal 1 of the embodiment, the entire peripheral layer 4 has a multilayer structure made of a specific composition. Specifically, the entire peripheral layer 4 includes a tin-based layer 41 and a barrier layer 40. The tin-based layer 41 includes a pure tin layer 43. The pure tin layer 43 constitutes an outermost surface in a region on the side of the first end part of the PCB terminal 1. The formation of solder icicles is suppressed and the formation of whiskers on the pure tin layer 43 is suppressed by the barrier layer 40.

The base material 2 and the plating layer 3 are successively described below.

(Base Material)

<Composition>

The base material 2 as a main component of the PCB terminal 1 is made of copper alloy containing zinc (Zn). In particular, this copper alloy contains 20% by mass or more of Zn with the balance being copper (Cu) and unavoidable impurities and contains Cu most. A content of Zn is typically more than 20% by mass and 45% by mass or less. Typical examples of copper alloys containing Z in the above range include brasses with alloy numbers C2600, C2680 and the like specified in JIS H 3100:2018. C2600 and C2680 contain Zn in a range of 28% by mass or more and 40% by mass or less. Brasses are inexpensive as compared to other copper alloys. In this respect, manufacturing cost tends to be reduced.

<Shape>

The outer shape of the base material 2 is typically a rectangular parallelepiped. Other examples of the outer shape of the base material 2 include polygonal prism shapes such as hexagonal prism shapes and pillar shapes having a curved outer peripheral surface such as cylindrical shapes and elliptical pillar shapes. Although not shown, the base material 2 may have a part locally protruding at an appropriate position in a longitudinal direction thereof. The protruding part is used, such as for positioning with respect to the housing 60.

Figure 2:
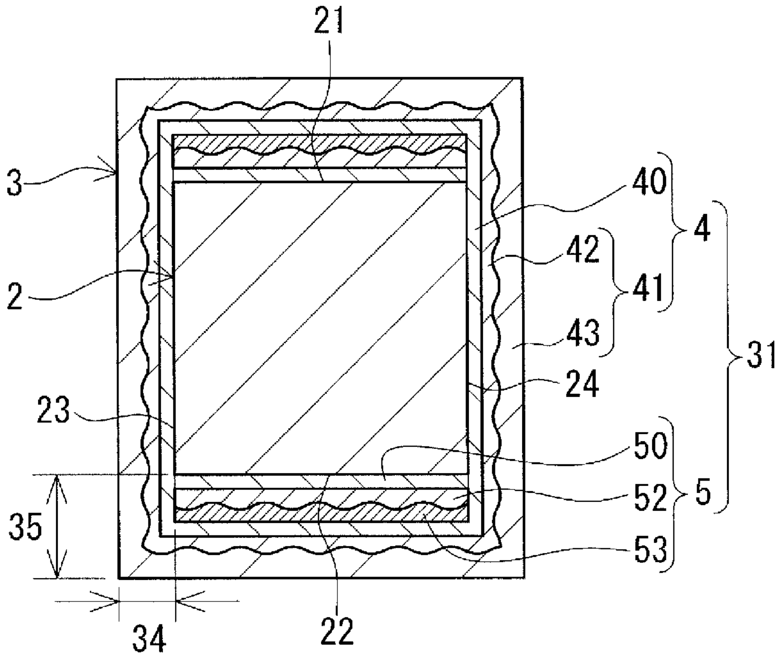
FIG. 2 is a section along II-II of the PCB terminal shown in FIG. 1.
Figure 3:
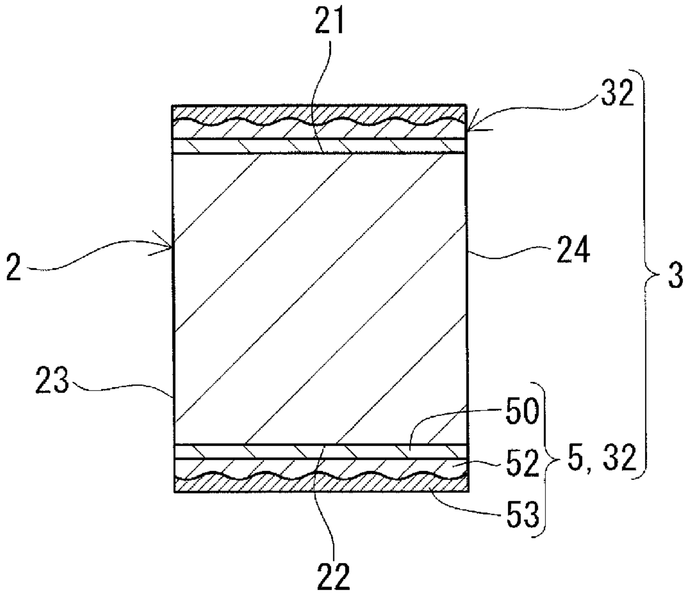
FIG. 3 is a section along III-III of the PCB terminal shown in FIG. 1.

If each end part of the base material 2 has a rectangular parallelepiped outer shape, a cross-sectional shape in the region on the side of each end part of the base material 2 is rectangular as shown in FIGS. 2 and 3. Typically, the above cross-sectional shape is a square shape. A cross-section here is a transverse cross-section cut by a plane orthogonal to an axis of the base material 2. If the cross-sectional shape is rectangular, the outer peripheral surface of the base material 2 has a first surface 21 and a second surface 22 arranged to face each other and a third surface 23 and a fourth surface 24 arranged to face each other in the above cross-section. The third and four surfaces 23, 24 are arranged substantially orthogonally to the first and second surfaces 21, 22. In FIGS. 2 and 3, the first and second surfaces 21, 22 are upper and lower surfaces and the third and fourth surfaces 23, 24 are left and right surfaces.

<Size>

A size, e.g. a length, a width and a height, of the base material 2 can be appropriately selected. The length of the base material 2 is a length along the axis of the base material 2. The width of the base material 2 is a length along a direction orthogonal to the axis of the base material 2. The height is a length along a direction orthogonal to both the axis and the width direction of the base material 2. In the cross-sections shown in FIGS. 2 and 3, a lateral direction is the width direction and a vertical direction is a height direction. Thus, in the above cross-sections, the width of the base material 2 corresponds to lengths of the first and second surfaces 21, 22. In the above cross-sections, the height of the base material 2 corresponds to lengths of the third and fourth surfaces 23, 24. The width of the base material 2 and the height of the base material 2 are, for example, 0.3 mm or more and 5.0 mm or less.

(Plating Layer)

<Summary>

A predetermined region of the surface of the base material 2 is covered by the plating layer 3 as shown in FIG. 1. The plating layer 3 includes a first coating portion 31 and second coating portions 32.

The first coating portion 31 is provided in the region on the side of the first end part, out of the both end parts of the base material 2. The first coating portion 31 includes the entire peripheral layer 4 as shown in FIG. 2. The entire peripheral layer 4 includes the pure tin layer 43 made of pure tine. The pure tin layer 43 constitutes the outermost surface of the first coating portion 31. Further, the entire peripheral layer 4 includes the barrier layer 40 on a side closer to the base material 2 than the pure tin layer 43.

Here, the present inventors acquired the following knowledge. If the base material 2 is made of copper alloy containing more than 20% by mass of Zn, Zn in the copper alloy is thought to easily promote the formation of solder icicles. Further, if the base material 2 is made of the above copper alloy and the outermost surface of the plating layer 3 is the pure tin layer 43, Zn in the copper alloy diffuses to the surface of the pure tin layer 43 and compounds such as an oxide containing Zn are produced. This compound containing Zn is thought to easily promote the formation of whiskers. In contrast, if a layer made of pure nickel or copper-tin alloy is provided below the pure tin layer 43, solder icicles become shorter or substantially no solder icicles are preferably formed and whiskers are suppressed. Accordingly, the first coating portion 31 includes the barrier layer 40 made of pure nickel or copper-tin alloy below the pure tin layer 43.

The second coating portions 32 are provided in the region on the side of the second end part, out of the both end parts of the base material 2 (FIG. 1). The second coating portions 32 partially cover the base material 2 in the circumferential direction in the region on the side of the second end part as shown in FIG. 3. In this example, the second coating portion 32 includes an intermediate layer 52 made of copper-tin alloy and an outer layer 53 made of pure tin.

<Coating Structure>

As shown in FIG. 2, the first coating portion 31 of this example is a multilayer structure including the entire peripheral layer 4 and partial coating layers 5 (see also FIG. 1). The partial coating layers 5 are provided closer to the base material 2 than the entire peripheral layer 4. Further, the partial coating layers 5 partially cover the base material 2 in the circumferential direction. Thus, the first coating portion 31 does not have a uniform thickness over the entire periphery in the circumferential direction of the base material 2 at a predetermined point, e.g. at a point of 1 mm, along the longitudinal direction of the PCB terminal 1 from the first end part of the PCB terminal 1, and has partially different thicknesses in the circumferential direction of the base material 2. That is, the first coating portion 31 includes thin film portions 34 and thick film portions 35 at positions different in the circumferential direction of the base material 2.

The thin film portions 34 are regions of the first coating portion 31 having a relatively small thickness. In this example, the thin film portions 34 cover the third and fourth surfaces 23, 24, out of the aforementioned four surfaces of the base material 2. Further, the thin film portions 34 are constituted by parts of the entire peripheral layer 4. The entire peripheral layer 4 is a multilayer structure successively including the barrier layer 40 and the tin-based layer 41 having the pure tin layer 43 from the side of the base material 2. The barrier layer 40 is provided in contact with the third and fourth surfaces 23, 24 of the base material 2.

The thick film portions 35 are regions of the first coating portion 31 having a relatively large thickness. In this example, the thick film portions 35 cover the first and second surfaces 21, 22, out of the aforementioned four surfaces of the base material 2. Further, the thick film portion 35 is a multilayer structure including the remaining part of the entire peripheral layer 4 and the partial coating layer 5. In this example, the partial coating layer 5 includes an underlayer 50, the intermediate layer 52 and the outer layer 53 successively from the side of the base material 2.

Note that it can be typically confirmed that the first coating portion 31 includes the thin film portions 34 and the thick film portions 35 if a cross-section of the PCB terminal 1 cut by a plane orthogonal to the axis of the PCB terminal 1 is taken and this cross-sectional is observed by an optical microscope, a scanning electron microscope (SEM) or the like. The cutting position is, for example, a point of 1 mm from the first end part of the PCB terminal 1 along the longitudinal direction of the PCB terminal 1. This point is called an observation reference position below.

In this example, the partial coating layer 5 extends in the region on the side of the second end part of the base material 2 (FIG. 1). The second coating portion 32 is constituted by an extending part of the partial coating layer 5. Thus, the second coating portion 32 of this example is a multilayer structure including the underlayer 50, the intermediate layer 52 and the outer layer 53 (FIG. 3). Further, the second coating portion 32 can be said to be continuous with the first coating portion 31 via the partial coating layer 5.

The second coating portions 32 constituted by the partial coating layers 5 cover the first and second surfaces 21, 22, out of the aforementioned four surfaces of the base material 2, similarly to the thick film portions 35 of the first coating portion 31. The third and fourth surfaces 23, 24 of the base material 2 are both exposed without being covered by the second coating portions 32.

The first and second surfaces 21, 22 of the base material 2 are covered by the plating layer 3 from the first end part to the second end part. The third and fourth surfaces 23, 24 of the base material 2 are covered by the plating layer 3 on the side of the first end part, but not covered by the plating layer 3 on the side of the second end part.

The plating layer 3 including the first coating portion 31 and the second coating portions 32 having the aforementioned specific structures can be manufactured by using the multistage plating method. The multistage plating method is described in detail later.

<Composition>

Specific composition and effects of each layer constituting the plating layer 3 are described below.

<<Barrier Layer>>

Pure nickel constituting the barrier layer 40 contains 99% by mass or more of nickel (Ni) with the balance being unavoidable impurities. Further, pure nickel may contain 99.9% by mass or more of Ni.

The barrier layer 40 made of pure nickel can reliably prevent the diffusion of Zn in the base material 2 into the pure tin layer 43. By preventing the diffusion of Zn, the above compound containing Zn is hardly produced in the pure tin layer 43. Accordingly, the formation of solder icicles and the formation of whiskers are suppressed. Thus, pure nickel is suitable as a constituent material of the barrier layer 40. The constituent material of the barrier layer 40 of this example is pure nickel.

If the constituent material of the barrier layer 40 of this example is pure nickel, this barrier layer 40 is manufactured as a secondary plating layer by post-plating by successively forming a pure nickel layer and a pure tin layer in the multistage plating method to be described later. As described later, it is preferred to apply a heat treatment after the secondary plating layer is formed. The pure nickel layer in the secondary plating layer mainly functions as the barrier layer 40. The pure tin layer in the secondary plating layer functions as the pure tin layer 43.

The copper-tin alloy constituting the barrier layer 40 is an alloy containing copper and tin. This copper-tin alloy is typically a binary alloy of Sn and Cu with the balance being unavoidable impurities.

The barrier layer 40 made of copper-tin alloy has an effect of reducing the diffusion of Zn in the base material 2 into the pure tin layer 43. Since Zn hardly diffuses into the pure tin layer 43, the above compounds containing Zn are easily reduced. As a result, solder icicles and whiskers are hardly formed. Thus, the copper-tin alloy is suitable as the constituent material of the barrier layer 40.

If the constituent material of the barrier layer 40 of this example is the copper-tin alloy, this barrier layer 40 is manufactured as a secondary plating layer by post-plating by applying a heat treatment after a pure copper layer and a pure tin layer are successively formed in the multistage plating method to be described later. Conditions of the heat treatment are so adjusted that Cu in the pure copper layer and Sn in the pure tin layer are alloyed to form a copper-tin alloy and the pure tin layer remains. The formed copper-tin alloy layer functions as the barrier layer 40. The remaining pure tin layer functions as the pure tin layer 43. In this manufacturing method, the pure copper layer remains in some cases. Accordingly, the first coating portion 31 is allowed to include the pure copper layer below the barrier layer 40.

<<Tin-Based ased Layer>>

Pure tin constituting the pure tin layer 43 contains 99% by mass or more of Sn with the balance being unavoidable impurities. Further, pure tin may contain 99.8% by mass or more of Sn.

Pure tin is excellent in solder wettability. Thus, the region on the side of the first end part to which solder is applied is wetted well with solder over the entire periphery in the circumferential direction of the base material 2 by the outer surface of the first coating portion 31 being constituted by the pure tin layer 43 and the pure tin layer 43 being one layer constituting the entire peripheral layer 4. Particularly, in terms of suppressing solder icicles and whiskers, the pure tin layer 43 preferably contains a little Zn. More preferably, the pure tin layer 43 substantially does not contain Zn. If the diffusion of Zn in the base material 2 into the pure tin layer 43 is reduced, preferably prevented, by the above barrier layer 40, a Zn content in the pure tin layer 43 is small.

The tin-based layer 41 may be substantially composed only of the pure tin layer 43, but it is preferred to include an alloy portion 42 in addition to the pure tin layer 43 as shown in FIG. 2 if the constituent material of the barrier layer 40 is pure nickel. A constituent material of the alloy portion 42 is an alloy containing tin and nickel. The alloy portion 42 is provided in contact with the barrier layer 40. Note that FIG. 2 illustratively shows the alloy portion 42 in the form of a layer.

The tin-based layer 41 including the alloy portion 42 is manufactured as the aforementioned secondary plating layer by applying a heat treatment after the pure nickel layer and the pure tin layer are successively formed. Conditions of the heat treatment are so adjusted that an alloy containing tin and nickel is formed by alloying Ni in the pure nickel layer and Sn in the pure tin layer and the pure tin layer remains. The pure nickel layer after the heat treatment functions as the barrier layer 40. The remaining pure tin layer functions as the pure tin layer 43.

The present inventors acquired such knowledge that, if the tin-based layer 41 included the alloy portion 42, voids were hardly present between the barrier layer 40 made of pure nickel and the pure tin layer 43 after soldering. Thus, in the PCB terminal 1 provided with the tin-based layer 41 including the alloy portion 42, an increase in connection resistance due to voids is not caused. Therefore, connection resistance between the PCB terminal 1 and the printed wiring board 80 is low on the side of the first end part.

<<Outer Layer>>

The outer layer 53 functioning as the outermost layer on the side of the second end part is made of pure tine. The details of pure tin are as described above.

Pure tin is soft and easily deformed. Thus, the PCB terminal 1 can satisfactorily contact the mating terminal by the outer layers 53 on the side of the second end part. In this respect, connection resistance between the PCB terminal 1 and the mating terminal is reduced.

<<Intermediate Layer>>

The intermediate layer 52 provided closer to the base material 2 than the above outer layer 53 is made of copper-tin alloy containing copper and tin. This copper-tin alloy is typically a binary alloy of Sn and Cu with the balance being unavoidable impurities. This copper-tin alloy may contain Zn.

The intermediate layer 52 made of copper-tin alloy reduces the diffusion of Zn in the base material 2 into the tin-based layer 41 as described above. In this respect, the intermediate layer 52 made of copper-tin alloy contributes to suppressing whiskers on the side of the first end part and on the side of the second end part.

Further, the copper-tin alloy is harder than pure tin. Thus, the PCB terminal 1 can be easily inserted into the mating terminal by the presence of the intermediate layers 52 on the side of the second end part. In this example, the copper-tin alloy constituting the intermediate layer 52 is partially exposed from the outer layer 53. In particular, a surface side of the intermediate layer 52 is uneven. Protrusions of the intermediate layer 53 are exposed from the outer layer 53. In this case, the region on the side of the second end part of the PCB terminal 1 can be more easily inserted into the mating terminal. Thus, a burden of a worker is reduced.

The plating layer successively including the intermediate layer 52 and the outer layer 53 can be manufactured as a primary plating layer by pre-plating by applying a heat treatment after the pure tin layer is formed or after the pure copper layer and the pure tin layer are successively formed in the multistage plating method to be described later. Conditions of the heat treatment are so adjusted that the copper-tin alloy is formed by alloying Cu in the base material 2 or Cu in the pure copper layer and Sn in the pure tin layer and the pure tin layer remains. The formed copper-tin alloy layer functions as the intermediate layer 52. The remaining pure tin layer functions as the outer layer 53.

<<Underlayer>>

A constituent material of the underlayer 50 is, for example, pure nickel or nickel alloy.

The details of pure nickel are as described above.

A nickel alloy is an alloy containing additive elements with the balance being Ni and unavoidable impurities and containing Ni most. The additive elements are, for example, Sn, Zn, Cu and the like.

The underlayer 50 made of pure nickel or nickel alloy contributes to suppressing whiskers on the side of the first end part and on the side of the second end part.

Further, pure nickel or nickel alloy is harder than pure tin and copper-tin alloy. Thus, the underlayer 50 made of pure nickel or nickel alloy contributes to improving the abrasion resistance of the plating layer 3 due to its excellence in rigidity. Further, the underlayer 50 contributes to improving insertability into the mating terminal on the side of the second end part. Note that the underlayer 50 may be omitted.

<Thickness>

<<First Coating Portion>>

In this example, the thickness of the thick film portion 35 is larger than that of the thin film portion 34 by the thickness of the partial coating layer 5 in the first coating portion 31. That is, the thickness of the thick film portion 35 is substantially equal to the sum of the thickness of the thin film portion 34 and the thickness of the partial coating layer 5. Further, in this example, the thickness of the thin film portion 34 is equivalent to the total thickness of the entire peripheral layer 4.

<<Second Coating Portion>>

In this example, the thickness of the second coating portion 32 is equivalent to the thickness of the partial coating layer 5. Thus, the thickness of the second coating portion 32 is smaller than that of the first coating portion 31 by the total thickness of the entire peripheral layer 4. According to this thickness difference, the plating layer 3 has a step in the longitudinal direction of the base material 2 (FIG. 1).

<<Barrier Layer>>

A thickness of the barrier layer 40 is preferably 0.4 μm or more. If the thickness is 0.4 μm or more, solder icicles and whiskers are more reliably suppressed by the barrier layer 40. In terms of suppressing solder icicles and whiskers, the above thickness may be 0.5 μm or more, 1.0 μm or more or 1.3 μm or more. A thickness of the secondary plating layer by post-plating is finally so adjusted in the multistage plating method in a manufacturing process that the barrier layer 40 has a thickness of 0.4 μm or more, preferably 0.5 μm or more or 1.0 μm or more. If the barrier layer 40 is made of pure nickel, the thickness of the barrier layer 40 is substantially equal to a thickness of the pure nickel layer in the secondary plating layer. If the barrier layer 40 is made of copper-tin alloy alloyed in the manufacturing process as described above, the thickness of the barrier layer 40 tends to be smaller than a total thickness of the pure copper layer and the pure tin layer in the secondary plating layer. Thus, the thickness of the secondary plating layer when the barrier layer 40 is made of copper-tin alloy may be adjusted to be more than 0.4 μm or more, preferably 0.5 μm or more or 1.0 μm or more. The thicker the barrier layer 40 made of copper-tin alloy, the more easily the above diffusion of Zn is prevented. Particularly, solder icicles hardly become long.

No particular upper limit is provided for the thickness of the barrier layer 40. However, the thicker the barrier layer 40, the thicker the aforementioned secondary plating layer. The present inventors acquired such knowledge that the barrier layer 40 was hardly properly formed if the secondary plating layer was thick to a certain extent since unfavorable compounds and the like were produced. Further, the thicker the secondary plating layer, the longer a plating time. Furthermore, the thicker the barrier layer 40, the larger the PCB terminal 1. The above thickness is, for example, 3.0 μm or less in terms of the suppression of solder icicles and whiskers, manufacturability and miniaturization.

If the thickness of the barrier layer 40 is, for example, 0.4 μm or more and 3.0 μm or less, the PCB terminal 1 is small in size and excellent in manufacturability besides being capable of satisfactorily suppressing solder icicles and whiskers.

The thickness of the barrier layer 40 is measured using a component analysis by an X-ray fluorescence film thickness meter. A measurement point is the above observation reference position.

Alternatively, the thickness of the barrier layer 40 may be measured using an image obtained by observing a cross-section cut at the observation reference position by a microscope. In this case, a plurality of measurement points are taken for the thickness of the barrier layer 40 in the observation image. For example, three or more measurement points are taken. The thickness of the barrier layer 40 is an average value of a plurality of thicknesses.

<<Pure Tin Layer>>

A thickness of the pure tin layer 43 is, for example, 0.5 μm or more. If the thickness is 0.5 μm or more, the region on the side of the first end part of the PCB terminal 1 is wetted well with solder. In terms of good solder wettability, the above thickness may be 0.6 μm or more, or 0.8 μm or more.

Further, if the above thickness is 1.0 μm or more, the region on the side of the first end part of the PCB terminal 1 is more reliably wetted with solder.

No particular upper limit is provided for the thickness of the pure tin layer 43. However, the thicker the pure tin layer 43, the larger the PCB terminal 1 and the longer a plating time. The above thickness is, for example, 3.9 μm or less or 3.5 μm or less in terms of miniaturization and manufacturability.

If the thickness of the pure tin layer 43 is, for example, 0.5 μm or more and 3.9 μm or less, further 1.0 μm or more and 3.5 μm or less, the PCB terminal 1 is small in size and excellent in manufacturability besides being excellent in solder wettability.

<<Outer Layer>>

A thickness of the outer layer 53 is, for example, 0.3 μm or more. If the thickness is 0.3 μm or more, a contact area of the region on the side of the second end part of the PCB terminal 1 and the mating terminal is properly secured. As a result, connection resistance between the PCB terminal 1 and the mating terminal tends to be reduced. In terms of reducing the connection resistance, the above thickness may be, for example, 0.4 μm or more, 0.7 μm or more or further 1.0 μm or more.

No particular upper limit is provided for the thickness of the outer layer 53. However, the thicker the outer layer 53, the larger the PCB terminal 1 and the longer a plating time. The above thickness is, for example, 2.0 μm or less or 1.8 μm or less in terms of miniaturization and manufacturability.

If the thickness of the outer layer 53 is, for example, 0.3 μm or more and 2.0 μm or less, the PCB terminal 1 is small in size and excellent in manufacturability besides easily reducing the connection resistance.

<<Intermediate Layer>>

A thickness of the intermediate layer 52 is, for example, 0.1 μm or more. If the thickness is 0.1 μm or more, the region on the side of the second end part of the PCB terminal 1 can be easily inserted into the mating terminal. Further, whiskers are hardly formed on the surface of the outer layer 53 on the side of the second end part. In terms of good insertability into the mating terminal and the suppression of whiskers, the above thickness may be, for example, 0.2 μm or more.

No particular upper limit is provided for the thickness of the intermediate layer 52. However, the thicker the intermediate layer 52, the larger the PCB terminal 1 and the longer a heat treatment time. The above thickness is, for example, 2.0 μm or less or 1.8 μm or less in terms of miniaturization and manufacturability.

If the thickness of the intermediate layer 52 is, for example, 0.1 μm or more and 2.0 μm or less, the PCB terminal 1 is small in size and excellent in manufacturability besides being excellent in insertability into the mating terminal.

<<Underlayer>>

A thickness of the underlayer 50 is, for example, 0.3 μm or more and 4.0 μm or less, further 0.5 μm or more and 2.0 μm or less.

<Whiskers>

It is desirable that the first coating portion 31 has a small number of whiskers. Particularly, it is desirable that the first coating portion 31 including the thin film portions 34 has substantially no whiskers.

The whiskers here are protrusions made of tin, and relatively long protrusions specified in JIS C 60068-2-82: 2009, e.g. needle-like protrusions having a length of 10 μm or longer. Note that spherical protrusions called nodules are known as protrusions made of tin. The nodules are relatively short protrusions. Even if the nodules are present, the aforementioned short circuit is unlikely to occur if the number of whiskers is small or preferably no whiskers are present. Thus, the nodules are allowed. However, preferably, the nodules are also not present.

Connector

The connector of the embodiment is described below mainly with reference to FIG. 4.

The connector 6 of the embodiment includes the PCB terminal 1 of the embodiment. Typically, the connector 6 is a male connector provided with a plurality of the PCB terminals and the housing 60. Each PCB terminal 1 is, for example, held in a state bent into an L shape in the housing 60.

The housing 60 is a molded body made of an electrically insulating material such as a resin. The housing 60 includes a bottom portion and a peripheral wall portion. A plurality of unillustrated penetration holes are provided in alignment in the bottom portion. The plurality of PCB terminals 1 are respectively press-fit into the plurality of penetration holes, thereby being held by the bottom portion. The respective PCB terminals 1 held by the bottom portion are arranged at predetermined intervals in each of a vertical direction and a direction perpendicular to the plane of FIG. 4. The peripheral wall portion rises from the peripheral edge of the bottom portion and is annularly continuous. A mating connector provided with the mating terminals, e.g. a connector 76 shown in FIG. 5 to be described later, is inserted into an internal space surrounded by the bottom portion and the peripheral wall portion. Note that a part of the housing 60 is shown in section in FIG. 4 and FIG. 6 to be described later.

In each PCB terminal 1, the region on the side of the first end part provided with the first coating portion 31 is exposed outside the housing 60. In each PCB terminal 1, the region on the side of the second end part provided with the second coating portions 32 is arranged in the internal space of the housing 60. FIG. 4 illustrates a state where each PCB terminal 1 is so held in the housing 60 that the first and second surfaces 21, 22 of the base material 2 provided with the second coating portions 32 are upper and lower surfaces. If the connector 76 is inserted into the internal space, the second coating portions 32 contact the mating terminals. By this contact, the PCB terminals 1 and the mating terminals are electrically connected.

The number of the PCB terminals 1, the arranged positions of the PCB terminals 1 in the bottom portion of the housing 60, the shape of the housing 60, a constituent material of the housing 60 and the like in the connector 6 can be appropriately selected.

Wiring Harness with Connector

A wiring harness with connector of the embodiment is described below mainly with reference to FIG. 5.

A wiring harness with connector 7 of this embodiment includes the connector 6 of the embodiment and a wiring harness 70. The wiring harness 70 is connected to the region on the side of the second end part provided with the second coating portions 32 (FIG. 4) in each PCB terminal 1. The region on the side of the first end part provided with the first coating portion 31 (FIG. 4) in each PCB terminal 1 is electrically connected to the printed wiring board 80. One end of the wiring harness 70 is electrically connected to the printed wiring board 80 by the connector 6. The other end of the wiring harness 70 is electrically connected to an unillustrated electronic device controlled by the printed wiring board 80.

The wiring harness 70 includes one or more wires 71 and connectors 74, 75 to be mounted on respective end parts of the wires 71.

The wire 71 includes a conductor and an electrically insulating layer. The electrically insulating layer covers the outer periphery of the conductor.

The conductor is typically made of an electrically conductive material such as copper, copper alloy, aluminum or aluminum alloy.

The electrically insulating layer is made of an electrically insulating material such as a resin.

An appropriate male or female connector can be used as the connector 74, 75.

Figure 5:
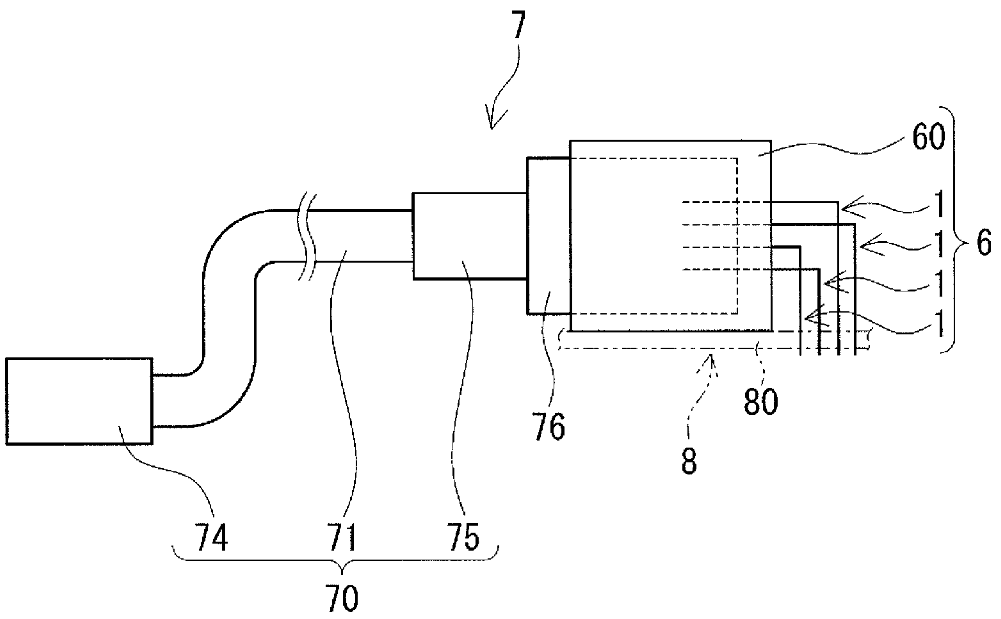
FIG. 5 is a side view schematically showing a wiring harness with connector according to the embodiment.

The wiring harness with connector 7 may include the other connector 76 between the connector 75 of the wiring harness 70 and the connector 6 of the embodiment as illustrated in FIG. 5. For example, the connector 75 is a male connector and the connector 76 is a female connector.

Board Unit

A board unit of the embodiment is described below mainly with reference to FIG. 6.

A board unit 8 of the embodiment includes the connector 6 of the embodiment or the wiring harness with connector 7 (FIG. 5) of the embodiment and the printed wiring board 80. The region on the side of the first end part provided with the first coating portion 31 in each PCB terminal 1 and the printed wiring board 80 are connected by solder 85. The board unit 8 shown in FIG. 6 includes the connector 6 of the embodiment. Reference may be made to a two-dot chain line of FIG. 5 for the board unit 8 provided with the wiring harness with connector 7 of the embodiment.

The printed wiring board 80 includes a plurality of through holes 81. The region on the side of the first end part of the PCB terminal 1 is inserted into the through hole 81. The tip of the first end part of each PCB terminal 1 inserted into the through hole 81 projects from a surface of the printed wiring board 80. The region on the side of the first end part of the PCB terminal 1 and the through hole 81 are made conductive by the solder 85. Note that a part of the printed wiring board 80 is shown in section in FIG. 6. Further, only a cross-section of one through hole 81 is shown as a representative in FIG. 6.

The printed wiring board 80 controls the electronic device connected to the connector 74 of the wiring harness 70 by the wiring harness 70 connected to the region on the side of the second end part of each PCB terminal 1. Note that the printed wiring board 80 is accommodated in an unillustrated case.

The printed wiring board 80 includes, for example, a control circuit 88 for controlling at least one of engine fuel injection and engine ignition. The control circuit 88 includes an unillustrated circuit pattern provided on the printed wiring board 80 and unillustrated electronic components and the like mounted on the printed wiring board 80. The board unit 8 provided with such a printed wiring board 80 is called an engine control unit. The engine control unit may include many, e.g. 200 or more or further 250 or more PCB terminals 1. The board unit 8 other than the engine control unit may also be provided with many PCB terminals 1.

(Main Effects)

The PCB terminal 1 of the embodiment can suppress solder icicles and whiskers by the barrier layer 4 on the side of the first end part. Thus, in the above application provided with many PCB terminals 1, the first end parts of adjacent ones of the PCB terminals 1 can be prevented from being short-circuited by solder icicles and prevented from being short-circuited by whiskers.

The PCB terminal 1 of the embodiment is also excellent in solder wettability by including the pure tin layer 43 on the side of the first end part. Further, the PCB terminal 1 of the embodiment is excellent in insertability into the mating terminal on the side of the second end part. The connection resistance between the PCB terminal 1 and the mating terminal can also be reduced by the second coating portions 32.

The connector 6 of the embodiment, the wiring harness with connector 7 of the embodiment and the board unit 8 of the embodiment can suppress solder icicles and whiskers on the sides of the first end parts of the PCB terminals 1 by including the PCB terminals 1 of the embodiment. Thus, particularly even if the connector 6 is a multipole connector including many PCB terminals 1, the first end parts of adjacent ones of the PCB terminals 1 can be prevented from being short-circuited by solder icicles and prevented from being short-circuited by whiskers.

Further, even if the connector 6 is a multipole connector, the first end part of each PCB terminal 1 and the printed wiring board 80 are satisfactorily connected by solder. Furthermore, even if the connector 6 is a multipole connector, each PCB terminal 1 is easily inserted into each mating terminal. Thus, the worker can easily connect the connector 6 and the mating connector.

(Manufacturing Method of PCB Terminal)

Figure 7:
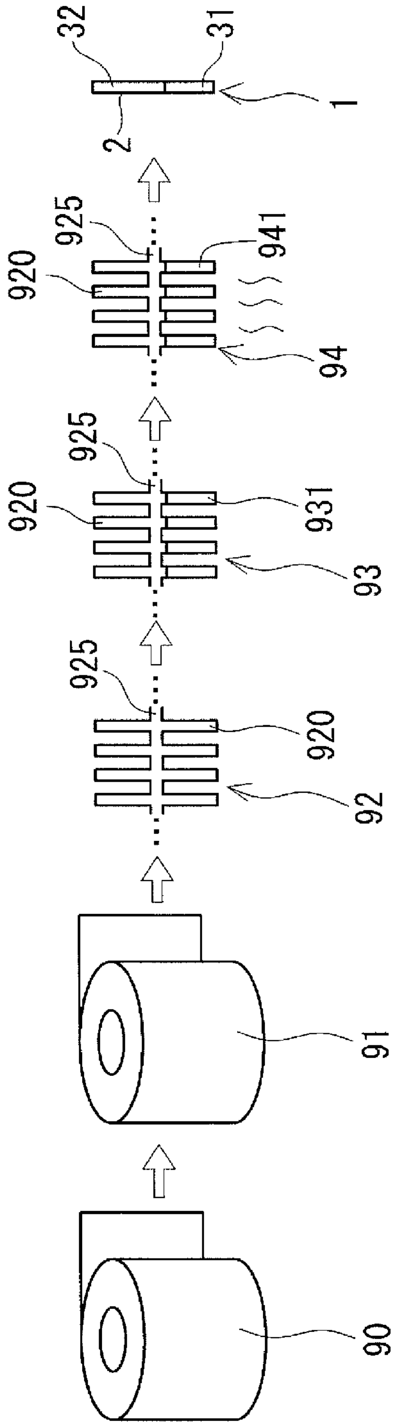
FIG. 7 is a process chart showing a manufacturing method of the PCB terminal.

An example of a manufacturing method of the PCB terminal 1 is described below with reference to FIG. 7 as appropriate.

The PCB terminal 1 of the embodiment is, for example, manufactured as follows. First, a plated base material is formed by the so-called pre-plating method. The secondary plating layer is formed only in a region on the side of a first end part of the obtained plated base material. No secondary plating layer is formed in a region on the side of a second end part of the plated base material. After the secondary plating layer is formed, a heat treatment is performed.

The above manufacturing method, i.e. the multistage plating method, is based on the following knowledge.

In the pre-plating method, the plating layer tends to have a uniform thickness. However, cut surfaces by stamping are formed in a formed body obtained by the pre-plating method. The base material is exposed on the cut surfaces. The formed body is poor in solder wettability due to these exposed parts of the base material.

If a pure tin layer is further formed to cover only the region on the first end part of the base material including the cut surfaces, out of the formed body, solder wettability is enhanced. However, if the constituent material of the base material is a copper alloy containing more than 20% by mass of Zn, solder icicles are easily formed if solder is applied to the pure tin layer. Further, whiskers are easily formed on the pure tin layer, which is the outermost layer. In contrast, if the barrier layer 40 is present below the pure tin layer, solder icicles and whiskers are hardly formed or preferably substantially not formed. Further, it is preferred to apply the heat treatment after the formation of the secondary plating layer since the barrier layer 40 is satisfactorily formed.

From the above knowledge, the multistage plating method includes the following forming step, secondary plating step and heat treatment step.

<Forming Step>

This step is a step of fabricating a forming material 92, in which a plurality of rod-like portions 920 are arranged in parallel, by stamping a plated plate 91 into a predetermined shape.

<Secondary Plating Step>

This step is a step of forming a secondary plating layer 931 in a region on the side of a first end part of each rod-like portion 920.

<Heat Treatment Step>

This step is a step of applying a heat treatment to a partially plated material 93 provided with the secondary plating layer 931.

Each step is described in detail below.

<Forming Step>

In the forming step, the forming material 92 is manufactured by the sol-called pre-plating method.

<<Plated Plate>>

The plated plate 91 used in the forming step includes a material plate 90 and an unillustrated primary plating layer. FIG. 7 shows elongated plate materials wound in coils as the material plate 90 and the plated plate 91.

A constituent material of the material plate 90 is a copper alloy containing more than 20% by mass of zinc. The above paragraph (Base Material) <Composition> may be referred to for the details of this copper alloy.

The primary plating layer includes a pure tin layer made of pure tin. The primary plating layer may include only the pure tin layer, but may include layers other than the pure tin layer. The layers other than the pure tin layer are, for example, an intermediate layer made of the aforementioned copper tin alloy, an underlayer and the like. A specific example of the primary plating layer includes the underlayer 50, the intermediate layer 52 and the outer layer 53. The details of the composition and thickness of each layer are as described above.

The plated plate 91 is manufactured by a known manufacturing method. The primary plating layer is formed by various plating methods, typically by an electroplating method. Plating conditions may be so adjusted that the thickness of each layer is a predetermined thickness. The plated plate 91 provided with the intermediate layer 52 and the outer layer 53 can be manufactured by applying a heat treatment after the pure tin layer is formed. Reference may be made to known conditions for heat treatment conditions.

<<Forming Material>>

The forming material 92 includes the plurality of rod-like portions 920 and a coupling portion 925.

Th plurality of rod-like portions 920 are so arranged side by side at predetermined intervals that axes of the respective rod-like portions 920 are parallel. The coupling portion 925 connects adjacent ones of the rod-like portions 920. Typically, the coupling portion 925 is provided at and near center positions of the rod-like portions 920 in a longitudinal direction.

The material plate 90 is exposed in parts of adjacent ones of the rod-like portions 920 facing each other, except at positions where the coupling portion 925 is formed. Each of the front and back surfaces, i.e. a first surface and a second surface facing the first surface, of each rod-like portion 920, includes the primary plating layer.

The forming material 92 is manufactured by a known press-forming method. Typically, a cross-sectional shape of each end part of each rod-like portion 920 cut by a plane orthogonal to the axis of each rod-like portion 920 is the rectangular shape shown in FIG. 3. The forming material 92 having a rectangular cross-sectional shape can be easily formed by stamping.

<<Secondary Plating Step>>

In the secondary plating layer, plating is partially applied to the forming material 92 by the pre-plating method, thereby forming the secondary plating layer 931. That is, the post-plating method is partially carried out.

In particular, the secondary plating layer 931 is formed in the region on the side of the first end part of each rod-like portion 920 in the forming material 92. The secondary plating layer 931 is not formed in the region on the side of the second end part of each rod-like portion 920. Thus, regions where the material plate 90 is exposed and regions provided with the primary plating layer are present at positions different in a circumferential direction of each rod-like portion 920 in the region on the side of the second end part of each rod-like portion 920.

The secondary plating layer 931 is formed to cover the entire periphery of each rod-like portion 920 in the circumferential direction in the region on the side of the first end part of each rod-like portion 920. As a result, the secondary plating layer 931 includes first coating parts provided in contact with the regions where the material plate 90 are exposed and second coating parts provided in contact with not the material plate 90, but the primary plating layer. The first and second coating parts are present at positions different in the circumferential direction of each rod-like portion 920. The first coating part finally constitutes the aforementioned thin film portion 34. The second coating part finally constitutes the aforementioned thick film portion 35.

The secondary plating layer 931 successively includes a first layer and a second layer from inside. A constituent material of the first layer is pure nickel or pure copper. A constituent material of the second layer is pure tin. The first layer is mainly provided to form the barrier layer 40. The second layer is mainly provided to form the pure tin layer 43.

If the constituent material of the first layer is pure nickel, the PCB terminal 1 provided with the barrier layer 40 made of pure nickel is finally manufactured. Further, the PCB terminal 1 provided with the tin-based layer 41 including the alloy portion 42 is manufactured by the heat treatment to be described later.

If the constituent material of the first layer is pure copper, the PCB terminal 1 provided with the barrier layer 40 made of copper-tin alloy is finally manufactured by the heat treatment to be described later.

The secondary plating layer 931 is formed by various plating methods, typically by an electroplating method. Plating conditions may be so adjusted that the barrier layer 40 has a predetermined thickness after the heat treatment to be described later. Note that a pretreatment such as degreasing or acid cleaning may be performed before the secondary plating layer 931 is formed.

Particularly, in the case of forming the barrier layer 40 made of pure nickel, a thickness of the pure nickel layer, out of the secondary plating layer 931, is, for example, 0.5 μm or more and 3.0 μm or less.

Here, the present inventors acquired such knowledge that solder icicles tended to be long if the pure nickel layer provided as the secondary plating layer 931 was as thin as 0.2 μm or less. One of reasons for this is thought to be that the barrier layer 40 made of pure nickel does not substantially remain due to the diffusion of Ni in the pure nickel layer into the pure tin layer or base material 2. The thicker the pure nickel layer, the thicker the remaining barrier layer 40 made of pure nickel. However, if the pure nickel layer provided as the secondary plating layer 931 is as thick as more than 5.0 μm, unfavorable compounds are thought to be produced in a nickel plating solution by Sn in the primary plating layer. One of reasons for this is that Sn is an amphoteric metal. Further, the thicker the pure nickel layer, the more likely the surface of the pure nickel layer becomes uneven. The production of the compounds is thought to be promoted by the above unevenness. Further, the thicker the pure nickel layer, the longer an immersion time of the forming material 92 in the nickel plating solution. Also from this, the compounds are thought to be easily produced. There is a concern that the barrier layer 40 is not finally properly formed by the compounds included in the pure nickel layer or pure tin layer. Therefore, the pure nickel layer in the secondary plating layer 931 is thought to preferably exceed 0.2 μm in thickness and be thin to a certain extent.

<Heat Treatment Step>

In the case of forming the barrier layer 40 made of copper-tin alloy, it is necessary to perform the heat treatment to alloy Cu in the pure copper layer and Sn in the pure tin layer. On the other hand, the heat treatment can be omitted in the case of forming the barrier layer 40 made of pure nickel. However, the present inventors acquired such knowledge that voids were less likely to be formed between the barrier layer 40 and the pure tin layer 43 after soldering if the heat treatment was applied after the formation of the secondary plating layer 931 than if the heat treatment was not applied in the case of forming the barrier layer made of pure nickel. In particular, if the heat treatment is not applied after secondary plating, voids were present between the barrier layer 40 made of pure nickel and the pure tin layer 43 after soldering. However, if the heat treatment is applied after secondary plating, voids were not present as described above. One of reasons why voids were absent is presumed to be that an alloy having a low melting point was formed by the heat treatment and the melted alloy having the low melting point filled up the voids at a heating temperature during soldering. If the voids are absent, an increase in electrical resistance due to the voids is not caused. As a result, an increase in connection resistance is hardly caused. Further, if the voids are absent, the plating layer is not peeled due to the voids. Thus, in the multistage plating method, the heat treatment is performed after the formation of the secondary plating layer 931.

A heat treatment temperature can be appropriately selected within a range in which the aforementioned alloying occurs. The higher the heat treatment temperature, the easier the alloying. Thus, on the side of the first end part, the alloy portion 42 is easily present. Further, voids are unlikely to be formed, preferably substantially no voids are formed. On the side of the second end part, the intermediate layer 52 tends to be thick. Thus, the PCB terminal 1 is excellent in insertability into the mating terminal.

However, the higher the heat treatment temperature, the smaller the remaining thickness of the pure tin layer on the side of the first end part. Thus, solder wettability is possibly reduced. On the side of the second end part, the primary plating layer, particularly, the pure tin layer, is easily melted. By this melting, a locally thick part, e.g. an enlarged part is possibly formed. If the enlarged part is formed, insertability into the mating terminal is reduced. Therefore, the heat treatment temperature is preferably a temperature at which the pure tin layer properly remains on the side of the first end part and the primary plating layer is hardly melted on the side of the second end part.

A specific heat treatment temperature is below a melting point of tin. The melting point of tin is about 232° C. In terms of preventing the melting of the aforementioned primary plating layer and improving solder wettability, the heat treatment temperature may be, for example, 225° C. or lower or 220° C. or lower. In terms of good alloying, the heat treatment temperature is 150° C. or higher, further higher than 180° C., 190° C. or higher or 200° C. or higher.

A holding time of the heat treatment temperature can be appropriately selected according to the size of the rod-like portions 920 and the like. For example, the holding time is 5 sec or more and 60 sec or less. Upon the elapse of a predetermined holding time, heating is stopped and the heat treatment step is finished.

A heat-treated material 94 obtained by way of the heat treatment step includes a heat treatment layer 941 manufactured from the secondary plating layer 931 in the region on the side of the first end part of each rod-like portion 920. The heat treatment layer 941 includes the barrier layer 40 made of pure nickel or copper-tin alloy and the pure tin layer 43 made of pure tin. If the barrier layer 40 is made of pure nickel, the pure tin layer 43 and the tin-based layer 41 including the alloy portion 42 are provided on the barrier layer 40. If the barrier layer 40 is made of copper-tin alloy, the tin-based layer 41 is substantially composed of the pure tin layer 43.

<Other Step>

The coupling portion 925 in the heat-treated material 94 is cut to separate adjacent ones of the rod-like portions 920, whereby the PCB terminals 1 of the embodiment are obtained. The heat treatment layer 941 on the side of the first end part of the rod-like portion 920 constitute the first coating portion 31. The primary plating layer constitutes the second coating portions 32 in the region on the side of the second end part of the rod-like portion 920.

Test Example 1

PCB terminals were fabricated using the aforementioned multistage plating method, and the number of tin protrusions and the quality of soldering were examined (Fabrication of Specimens)

In this test, specimens having different types of entire peripheral layers provided on first end parts, out of both end parts of the PCB terminals, were fabricated by making types of secondary plating layers different.

A specimen manufacturing process is outlined.

A forming material including a plurality of rod-like portions and a coupling portion is fabricated by stamping a plated plate formed with a primary plating layer into a predetermined shape. In the forming material, a secondary plating layer is formed to cover the entire periphery of each rod-like portion in a circumferential direction in a region on one end side of each of the rod-like portions arranged in parallel. After secondary plating, a heat treatment is applied to a partially plated material provided with the secondary plating layer. After the heat treatment, the PCB terminals are obtained by cutting the coupling portion linking adjacent ones of the rod-like portions. A heat treatment temperature is 210° C. A holding time of the heat treatment temperature is 30 sec.

The plated plate includes the primary plating layer on each of the front and back surfaces, i.e. a first surface and a second surface facing the first surface, of the copper alloy plate. The primary plating layer successively includes an underlayer made of pure nickel, an intermediate layer made of copper-tine alloy and an outer layer made of pure tin from inside. The copper-tin alloy constituting the intermediate layer is partially exposed from the outer layer.

The copper alloy plate is a plate made of brass with an alloy number C2600. A thickness of the copper alloy plate is 0.64 mm In Specimen No. 1, a pure nickel layer and a pure tin layer were successively formed from the side of a base material as a secondary plating layer. Out of the secondary plating layer, a thickness of the pure nickel layer is 1.34 μm. The pure nickel layer is directly provided on an exposed surface of the base material. The pure tin layer is provided in contact with the pure nickel layer.

In Specimen No. 101, only a pure tin layer was formed as a secondary plating layer. The pure tin layer is directly provided on an exposed surface of a base material.

(Structure of PCB Terminal)

The PCB terminal of each fabricated specimen includes a rod-like base material and a plating layer covering a predetermined region of the base material.

The PCB terminal of each specimen was cut at a point of 1 mm from the first end part, i.e. at an observation reference position, to take a cross-section and the structures of the base material and the plating layer were confirmed. Observation was carried out using an electron microscope.

In the PCB terminal of each specimen, the base material has a square cross-sectional shape. One side length of the square shape is 0.64 mm.

In the PCB terminal of each specimen, the plating layer on the side of the first end part includes an entire peripheral layer. Further, the plating layer on the side of the first end part includes thick film portions and thin film portions at positions different in a circumferential direction of the base material. The thin film portions are constituted by parts of the entire peripheral layer. Here, the thin film portions cover two facing surfaces, out of four surfaces constituting the outer peripheral surface of the base material. The thick film portions include the remaining parts of the entire peripheral layer and the aforementioned primary plating layer. Here, the thick film portions cover the remaining two surfaces not provided with the thin film portions, out of the four surfaces constituting the outer peripheral surface of the base material.

In the PCB terminal of each specimen, the base material is partially covered in the circumferential direction with the plating layer on the side of the second end part. The remaining parts of the base material in the circumferential direction are exposed without having the plating layer. The plating layer on the side of the second end part is provided on the two facing surfaces, out of the four surfaces constituting the outer peripheral surface of the base material. The plating layer on the side of the second end part is equivalent to the aforementioned primary plating layer. Further, the copper-tin alloy constituting the intermediate layer is partially exposed from the outer layer.

(Composition of Plating Layer)

In the aforementioned cross-section, a composition of the entire peripheral layer was confirmed. A component analysis was performed by Auger electron spectroscopy (AES).

In Specimen No. 1, a part of the entire peripheral layer provided in contact with the base material successively includes the pure nickel layer and the pure tin layer from the side of the base material. A part of the pure tin layer in contact with the pure nickel layer includes the alloy portion containing tin and nickel. Further, in Specimen No. 1, the outermost surface on the side of the first end part provided with the entire peripheral layer is constituted by the pure tin layer.

Using a commercially available X-ray fluorescence film thickness meter, thicknesses of the pure nickel layer and the pure tin layer in the entire peripheral layer were measured for the PCB terminal of Specimen No. 1. The thickness of the pure nickel layer is 1.34 μm. The thickness of the pure tin layer is 3.0 μm.

In Specimen No. 101, a part of the entire peripheral layer provided in contact with the base material includes no pure nickel layer. Further, in Specimen No. 101, the outermost surface on the side of the first end part provided with the entire peripheral layer is constituted by the pure tin layer.

(Number of Tin Protrusions)

In the PCB terminal of each specimen, the number of tin protrusions formed on the surface of the pure tin layer provided on the side of the first end part of the base material was measured.

The number of the tin protrusions is measured as follows.

The following temperature-humidity cycle is applied to the PCB terminal of each specimen to fabricate test pieces. A plurality of the test pieces are fabricated for each specimen.

<Conditions of Temperature-Humidity Cycle>

One cycle is defined to be the holding of each test piece in an environment under the following standard conditions after each test piece is held in an environment under high-temperature high-humidity conditions. The above cycle is repeated five times.

The high-temperature high-humidity conditions are a temperature of 85° C., a humidity of 85% and a holding time of 200 hrs.

The standard conditions are a temperature of 25° C., a humidity of 50% and a holding time of 24 hrs.

For each test piece after five cycles, a surface of the pure tin layer provided in the region on the side of the first end part of the base material is observed with a commercially available microscope. An observation region is a part of the pure tin layer constituting the aforementioned thin film portion and selected from the following predetermined range. The predetermined range is a range of 0.5 mm or more and 1.5 mm or less from the first end part of the PCB terminal along the longitudinal direction of the PCB terminal.

An observation field of view of a predetermined size is taken from an observation image of the microscope, and the number of whiskers in the observation field of view is counted for each test piece.

The observation field of view has a square shape having one side length of 0.35 mm. An observation magnitude is so adjusted that whiskers in the order of 10 μm are measurable.

(Quality of Soldering)

In the PCB terminal of each specimen, lengths (mm) of solider icicles were examined after soldering was applied to the region on the side of the first end part of the base material. Solder used for soldering is a lead-free solder alloy.

The lengths of the solder icicles are measured as follows.

In the PCB terminal of each specimen, the region on the side of the first end part is observed by being enlarged by a commercially available microscope. Using this observation image, the lengths of the solder icicles are measured. The length of the solder icicle is a distance from the first end part of the PCB terminal to the tip of the solder icicle. The position of the first end part of the PCB terminal is set on the basis of the position of the first end part of the PCB terminal to which soldering is not applied. The shorter the solder icicles, the better the soldering.

(Results)

In Specimen No. 101 including no pure nickel layer in the entire peripheral layer, whiskers were formed on 49 test pieces, out of 255 test pieces. Out of the test pieces formed with the whiskers, the lengths of the whiskers were 50 μm or less on 36 test pieces. However, on the remaining test pieces, the lengths of the whiskers were more than 50 μm. On some test pieces, the lengths of the solder icicles were 100 μm or more.

In contrast, in Specimen No. 1 including the pure nickel layer in the entire peripheral layer, no whiskers were formed on all the test pieces, out of ten test pieces.

Further, in Specimen No. 101 including no pure nickel layer in the entire peripheral layer, the lengths of the solder icicles were 0.77 mm.

In contrast, in Specimen No. 1 including the pure nickel layer in the entire peripheral layer, no solder icicles were formed.

One of reasons why such results were obtained is thought to be that the formation of whiskers and the growth of solder icicles due to Zn in the base material were suppressed by including the pure nickel layer below the pure tin layer in Specimen No. 1. In Specimen No. 101, whiskers and solder icicles are thought to be easily formed because Zn in the base material diffuses into the pure tin layer and the pure tin layer contains Zn.

From the above, it was shown that the formation of whiskers could be suppressed and solder icicles were substantially not formed by including the entire peripheral layer on the side of the first end part of the base material and including the pure nickel layer in the entire peripheral layer. Further, the PCB terminal capable of suppressing whiskers and soldering failures such as solder icicles was shown to be manufacturable by using the aforementioned multistage plating method.

Besides, a PCB terminal, to which the heat treatment was not applied after secondary plating, was fabricated as Specimen No. 201. Specimen No. 201 was fabricated in a manner similar to that for Specimen No. 1 except that the heat treatment was not applied after secondary plating unlike Specimen No. 1. For the PCB terminal of Specimen No. 1, the plating layer was confirmed after soldering. As a result, voids were found between the pure nickel layer and the pure tin layer. On the other hand, no voids were present between the pure nickel layer and the pure tin layer in the PCB terminal of Specimen No. 1. This showed that the heat treatment was preferably applied after secondary plating.

As a reference example, a PCB terminal was fabricated which does not include a pure nickel layer and includes a pure tin layer having a thickness of 4.0 μm in an entire peripheral layer. In the PCB terminal of this reference example, lengths of solder icicles were 0.7 mm or more. This showed that the pure nickel layer was preferably formed as the secondary plating layer to suppress solder icicles.

Test Example 2

PCB terminals which are provided with an entire peripheral layer on the side of a first end part of a rod-like base material and in which thicknesses of a pure nickel layer and a copper-tin alloy layer provided in the entire peripheral layer are different were fabricated and the quality of soldering was examined.

(Fabrication of Specimens)

In this test, the PCB terminals provided with the entire peripheral layer on the side of the first end part were fabricated using the aforementioned multistage plating method, similarly to Specimen No. 1 of Test Example 1. Basic manufacturing conditions are similar to those of Test Example 1. Further, a copper alloy plate used in this test is similar to that of Test Example 1.

In Specimens No. 2 to No. 4 and No. 102, a pure nickel layer and a pure tin layer were successively formed from the side of a base material as a secondary plating layer. The pure nickel layer is directly provided on an exposed surface of the base material. The pure tin layer is provided in contact with the pure nickel layer.

A thickness of the pure nickel layer is 0.41 μm, 0.61 μm and 0.78 μm in the order of Specimens No. 2 to No. 4.

A thickness of the pure nickel layer of Specimen No. 102 is 0.30 μm.

The thickness of the pure nickel layer and a thickness of a pure copper layer to be described later were measured using a commercially available X-ray fluorescence film thickness meter.

In Specimens No. 11 and No. 103, a pure copper layer and a pure tin layer were successively formed from the side of a base material as a secondary plating layer. The pure copper layer is directly provided on an exposed surface of the base material. The pure tin layer is provided in contact with the pure copper layer.

A thickness of the pure copper layer of Specimen No. 11 is 1.0 μm.

A thickness of the pure copper layer of Specimen No. 103 is 0.20 μm.

(Structure of PCB Terminal)

As in Test Example 1, a cross-section of the PCB terminal of each specimen was taken and the structures of the base material and the plating layer were confirmed.

Basic structures of the PCB terminals of Specimens No. 2 to No. 4 and No. 11 are similar to that of Specimen No. 1 of Test Example 1.

(Composition of Plating Layer)

In the aforementioned cross-section, a composition of the entire peripheral layer was confirmed as in Test Example 1.

In Specimens No. 2 to No. 4, a part of the entire peripheral layer provided in contact with the base material successively includes the pure nickel layer and the pure tin layer from the side of the base material. A part of the pure tin layer in contact with the pure nickel layer includes the alloy portion containing tin and nickel. The outermost surface on the side of the first end part provided with the entire peripheral layer is constituted by the pure tin layer.

Further, the thicknesses of the pure nickel layer and the pure tin layer were measured for the PCB terminals of Specimens No. 2 to No. 4 using a commercially available X-ray fluorescence film thickness meter.

In any of the specimens, the thickness of the pure nickel layer is 0.4 μm or more.

In any of the specimens, the thickness of the pure tin layer is 3.0 μm.

In Specimen No. 11, a part of the entire peripheral layer provided in contact with the base material is made of copper-tin alloy. This copper-tin alloy is substantially a binary alloy of Cu and Sn. Further, the surface of the copper-tin alloy layer does not substantially include Zn. A thickness of the copper-tin alloy layer is 0.5 μm. A thickness of the pure tin layer is 2.0 μm.

In Specimen No. 102, a part of the entire peripheral layer provided in contact with the base material includes no pure nickel layer. It is thought that the pure nickel layer did not remain in Specimen No. 102 due to the diffusion of Ni in the pure nickel layer into the pure tin layer or base material during the heat treatment after secondary plating.

In Specimen No. 103, a part of the entire peripheral layer provided in contact with the base material is made of copper-tin alloy. A thickness of this copper-tin alloy layer is less than 0.2 μm.

(Results)

As in Text Example 1, the lengths of solder icicles were measured.

In Specimen No. 102 including no pure nickel layer in the entire peripheral layer, the lengths of the solder icicles were 0.7 mm. In contrast, in Specimens No. 2 to No. 4 including the pure nickel layer in the entire peripheral layer, no solder icicles were formed.

This showed that solder icicles were not substantially formed because the entire peripheral layer was provided on the side of the first end part of the base material and included the pure nickel layer. Particularly, if the thickness of the pure nickel layer is 0.4 μm or more, solder icicles are substantially not formed. It was also shown that, in the PCB terminal in which solder icicles were not substantially formed, the thickness of the pure nickel layer in the secondary plating layer was more than 0.3 μm in the case of using the aforementioned multistage plating method.

On the other hand, in Specimen No. 103, the lengths of solder icicles were 0.5 mm. In contrast, in Specimen No. 11 including the copper-tin alloy layer in the entire peripheral layer, the lengths of solder icicles were 0.1 mm and shorter than those of Specimen No. 103. One of reasons why the solder icicles were long in Specimen No. 103 is thought to be that the pure tin layer contained Zn due to the diffusion of Zn in the base material into the pure tin layer during the heat treatment after plating.

This showed that the solder icicles could be made shorter by including the entire peripheral layer on the side of the first end part of the rod-like base material and including the copper-tin alloy layer in the entire peripheral layer. Particularly, if the copper-tin alloy layer is thick to a certain extent, preferably 0.5 μm or more, the solder icicles are thought to become shorter. To thicken the copper-tin alloy layer, the pure copper layer in the secondary plating layer may be thick to a certain extent. From the above, it was shown that the thickness of the pure copper layer in the secondary plating layer was preferably more than 0.3 μm in the PCB terminal capable of making solder icicles shorter in the case of using the aforementioned multistage plating method.

Note that the number of whiskers was examined as in Test Example 1. A result showed that no whiskers were formed on all the fabricated test pieces in Specimens No.2 to No. 4 and No. 11.

The present invention is not limited to these illustration and is intended to be represented by claims and include all changes in the scope of claims and in the meaning and scope of equivalents.

For example, the composition and size of the base material, the composition and thickness of the plating layer, the heat treatment conditions and the like in Test Examples 1, 2 can be changed as appropriate.

LIST OF REFERENCE NUMERALS

1 PCB terminal
2 base material
  21 first surface, 22 second surface, 23 third surface, 24 fourth surface
3 plating layer
  31 first coating portion, 32 second coating portion, 34 thin film portion, thick film portion
4 entire peripheral layer
  40 barrier layer, 41 tin-based layer, 42 alloy portion, 43 pure tin layer
5 partial coating layer
  50 underlayer, 52 intermediate layer, 53 outer layer
6 connector
  60 housing
7 wiring harness with connector
  70 wiring harness, 71 wire, 74, 75, 76 connector
8 board unit
  80 printed wiring board, 81 through hole, 85 solder, 88 control circuit
90 material plate, 91 plated plate, 92 forming material
93 partially plated plate, 94 heat-treated material
  920 rod-like portion, 925 coupling portion
  931 secondary plating layer, 941 heat treatment layer

What is claimed is:

1. A PCB terminal, comprising:
a rod-like base material; and
a plating layer covering a predetermined region of the base material,
wherein:
a constituent material of the base material is a copper alloy containing 20% by mass or more of zinc,
the plating layer includes a first coating portion and a second coating portion,
the first coating portion includes an entire peripheral layer entirely covering a region on side of a first end part, out of both end parts of the base material, in a circumferential direction of the base material,
the second coating portion partially covers a region on side of a second end part, out of the both end parts of the base material, in the circumferential direction of the base material,
the entire peripheral layer includes a tin-based layer and a barrier layer,
the tin-based layer includes a pure tin layer constituting an outermost surface of the first coating portion, and
a constituent material of the barrier layer is pure nickel or a copper-tin alloy containing copper and tin.

2. The PCB terminal of claim 1, wherein:
a constituent material of the barrier layer is pure nickel,
the tin-based layer includes an alloy portion in contact with the barrier layer, and
a constituent material of the alloy portion is an alloy containing tin and nickel.

3. The PCB terminal of claim 1, wherein a thickness of the barrier layer is 0.4 μm or more.

4. The PCB terminal of claim 1, wherein:
the first coating portion includes a thin film portion and a thick film portion at positions different in the circumferential direction of the base material,
the thin film portion is constituted by a part of the entire peripheral layer,
the thick film portion includes a remaining part of the entire peripheral layer and a partial coating layer provided closer to the base material than the entire peripheral layer,
the partial coating layer extends in the region on the side of the second end part of the base material, and
the second coating portion is constituted by an extending part of the partial coating layer.

5. The PCB terminal of claim 4, wherein:
the partial coating layer includes an intermediate layer and an outer layer,
a constituent material of the intermediate layer is a copper-tin alloy containing tin and copper,
a constituent material of the outer layer is pure tin, and
the copper-tin alloy constituting the intermediate layer is partially exposed from the outer layer.

6. A connector, comprising the PCB terminal of claim 1.

7. A board unit, comprising:

the connector of claim 6; and a printed wiring board, the region on the side of the first end part in the PCB terminal and the printed wiring board being connected by solder.

8. The board unit of claim 7, wherein the printed wiring board includes a control circuit for controlling at least one of engine fuel injection and engine ignition.

9. A wiring harness with connector, comprising:

the connector of claim 6; and a wiring harness, the wiring harness being connected to the region on the side of the second end part in the PCB terminal.

10. A board unit, comprising:

the wiring harness with connector of claim 9; and a printed wiring board, the region on the side of the first end part in the PCB terminal and the printed wiring board being connected by solder.

11. The board unit of claim 10, wherein the printed wiring board includes a control circuit for controlling at least one of engine fuel injection and engine ignition.

* * * * *